United States Patent
Little (10) Patent No.: US 8,374,903 B2
(45) Date of Patent: Feb. 12, 2013

(54) INFORMATION CRITERION-BASED SYSTEMS AND METHODS FOR CONSTRUCTING COMBINING WEIGHTS FOR MULTIMODEL FORECASTING AND PREDICTION

(75) Inventor: Mark Roland Little, Cary, NC (US)

(73) Assignee: SAS Institute Inc., Cary, NC (US)

( * ) Notice: Subject to any disclaimer, the term of this patent is extended or adjusted under 35 U.S.C. 154(b) by 1106 days.

(21) Appl. No.: 12/143,116

(22) Filed: Jun. 20, 2008

(65) Prior Publication Data

US 2009/0319310 A1    Dec. 24, 2009

(51) Int. Cl.
  *G06Q 10/00*    (2012.01)
(52) U.S. Cl. ............................. 705/7.31; 705/7.37
(58) Field of Classification Search ............... 705/7.31, 705/7.37
  See application file for complete search history.

(56) References Cited

U.S. PATENT DOCUMENTS

| | | | |
|---|---|---|---|
| 5,615,109 A * | 3/1997 | Eder .......................... | 705/7.12 |
| 5,918,232 A | 6/1999 | Pouschine et al. | |
| 5,953,707 A * | 9/1999 | Huang et al. ................. | 705/7.25 |
| 6,611,726 B1 | 8/2003 | Crosswhite | |
| 7,080,026 B2 | 7/2006 | Singh et al. | |
| 7,130,822 B1 | 10/2006 | Their et al. | |
| 7,240,019 B2 | 7/2007 | Delurgio et al. | |
| 7,660,734 B1 | 2/2010 | Neal et al. | |
| 7,689,456 B2 | 3/2010 | Schroeder et al. | |
| 7,693,737 B2 | 4/2010 | Their et al. | |
| 8,010,404 B1 | 8/2011 | Wu et al. | |
| 2003/0200134 A1* | 10/2003 | Leonard et al. ................ | 705/10 |
| 2005/0055275 A1 | 3/2005 | Newman et al. | |
| 2005/0159997 A1 | 7/2005 | John | |
| 2007/0094168 A1* | 4/2007 | Ayala et al. ..................... | 706/15 |
| 2007/0106550 A1 | 5/2007 | Umblijs et al. | |
| 2007/0203783 A1 | 8/2007 | Beltramo | |
| 2007/0208608 A1 | 9/2007 | Amerasinghe et al. | |
| 2009/0018996 A1 | 1/2009 | Hunt et al. | |

FOREIGN PATENT DOCUMENTS

WO        2005/124718        12/2005
WO    WO 2005124718 A2 *    12/2005

OTHER PUBLICATIONS

Eero Simoncelli, Least Squares Optimization, Center for Neural Science, and Couran Institute of Mathematical Sciences, Mar. 9, 2005.*
Jack Weiss, Lecture 16—Wednesday, Feb. 8, 2006, http://www.unc.edu/courses/2006spring/ecol/145/001/docs/lectures/lecture16.htm.*
SAS Institute Inc., SAS/ETS User's guide, Version 8, 1999.*
Burnham, Kenneth P. et al., "Multimodel Inference: Understanding AIC and BIC in Model Selection", Sociological Methods & Research, vol. 33, No. 2, pp. 261-304 [Nov. 2004].

(Continued)

*Primary Examiner* — Peter Choi
*Assistant Examiner* — Nadja Chong Cruz
(74) *Attorney, Agent, or Firm* — Kilpatrick Townsend & Stockton LLP (57) ABSTRACT

Systems and methods are provided for a computer-implemented method for automatically generating a weighted average forecast model that includes receiving a plurality of forecasting models and time series data. At least one parameter of each of the received forecasting models is optimized utilizing the received time series data. A weighting factor is generated for each of the plurality of optimized forecasting models utilizing an information criteria value indicating fit quality of each of the optimized forecasting models, and the generated weighting factors are stored.

39 Claims, 10 Drawing Sheets

OTHER PUBLICATIONS

Hibon, Michele et al., "To combine or not to combine: selecting among forecasts and their combinations", International Journal of Forecasting, vol. 21, pp. 15-24 [2005].

Kapetanios, George et al., "Forecasting Using Bayesian and Information-Theoretic Model Averaging: An Application to U.K. Inflation", Journal of Business & Economic Statistics, vol. 26, No. 1, pp. 33-41 [Jan. 2008].

Book, McQuarrie, Allan D.R. et al., "Regression and Time Series Model Selection", World Scientific Publishing Co. Pte. Ltd. (1998).

Akaike, Hirotugu (1974). "A new look at the statistical model identification". IEEE Transactions on Automatic Control 19 (6): 716-723.

Burnham, K. P., and Anderson, D.R. (2002). Model Selection and Multimodel Inference: A Practical Information-Theoretic Approach, 2nd ed. Springer-Verlag. ISBN 0-387-95364-7.

Schwarz, Gideon E. (1978). "Estimating the dimension of a model". Annals of Statistics 6 (2): 461-464.

Aiolfi, Marco et al., "Forecast Combinations," CREATES Research Paper 2010-21, School of Economics and Management, Aarhus University, 35 pp. (May 6, 2010).

Costantini, Mauro et al., "Forecast Combination Based on Multiple Encompassing Tests in a Macroeconomic DSGE System," Reihe Okonomie/ Economics Series 251, 24 pp. (May 2010).

Harvey, Andrew, "Forecasting with Unobserved Components Time Series Models," Faculty of Economics, University of Cambridge, Prepared for Handbook of Economic Forecasting, pp. 1-89 (Jul. 2004).

SAS Institute Inc., SAS/ETS User's Guide, Version 8, Chapter 25—Specifying Forecasting Models, pp. 1279-1305 (1999).

Simoncelli, Eero, "Least Squares Optimization," Center for Neural Science, and Courant Institute of Mathematical Sciences, pp. 1-8 (Mar. 9, 2005).

Weiss, Jack, "Lecture 16—Wednesday, Feb. 8, 2006," http://www.unc.edu/courses/2006spring/eco1/145/001/docs/lectures/lecture16.htm, 9 pp. (Feb. 9, 2006).

Yu, Lean et al., "Time Series Forecasting with Multiple Candidate Models: Selecting or Combining?", Journal of Systems Science and Complexity, vol. 18, No. 1, pp. 1-18 (Jan. 2005).

* cited by examiner

INFORMATION CRITERION-BASED SYSTEMS AND METHODS FOR CONSTRUCTING COMBINING WEIGHTS FOR MULTIMODEL FORECASTING AND PREDICTION

FIELD

The technology described in this patent document relates generally to the field of model forecasting and prediction and more specifically to the generation of combining weights for multimodel forecasting and prediction.

BACKGROUND

Accurate forecasting of future sales and other business variables is of great value to organizations. Accurate forecasts of product demands are needed for optimal inventory management, pricing, and resource planning. Automated computer algorithms for generating statistically-based predictions for larger numbers of items with no or minimal human intervention is beneficial for firms that sell many product items through numerous geographically distinct sales outlets as forecasts are often needed for each of tens of thousands of stock keeping units for each of hundreds of stores. In addition to business forecasting, statistical models for prediction are used in a wide variety of industrial applications.

For each item requiring forecasts or predictions, multiple statistical forecasting models are available. Deciding which of the available models, or combination of models, to use for predicting future values for a given item is a challenging problem. The utilization of multiple models in a prediction may offer improved predictive performance. To capitalize on this improved performance, systems and methods of generating weights for a weighted average of model outputs is described that uses information criteria indicative of fit quality of the utilized multiple models in determining model weights.

SUMMARY

In accordance with the teachings provided herein, systems and methods are provided for automatically generating a weighted average forecast model. For example, a plurality of forecasting models and time series data are received. At least one parameter of each of the received forecasting models is optimized utilizing the received time series data. A weighting factor is generated for each of the plurality of optimized forecasting models utilizing an information criteria value indicating the fit quality of each of the optimized forecasting models, and the generated weighting factors are stored.

As another illustration, systems and methods may be used for automatically generating a weighted average forecast model that includes a plurality of forecasting models and a file containing time series data indicative of transactional activity. A model fitter receives the plurality of forecasting models and the file of time series data and optimizes at least one parameter of each of the plurality of forecasting models based on the time series data. A forecast calculator is configured to receive the plurality of optimized forecasting models and generates a forecasted output for each of the plurality of optimized forecasting models. A model evaluator is configured to receive the plurality of optimized forecasting models and generate a weighting factor utilizing an information criteria for each of the forecasting models indicating fit quality of each of the optimized forecasting models.

DETAILED DESCRIPTION

Figure 1:
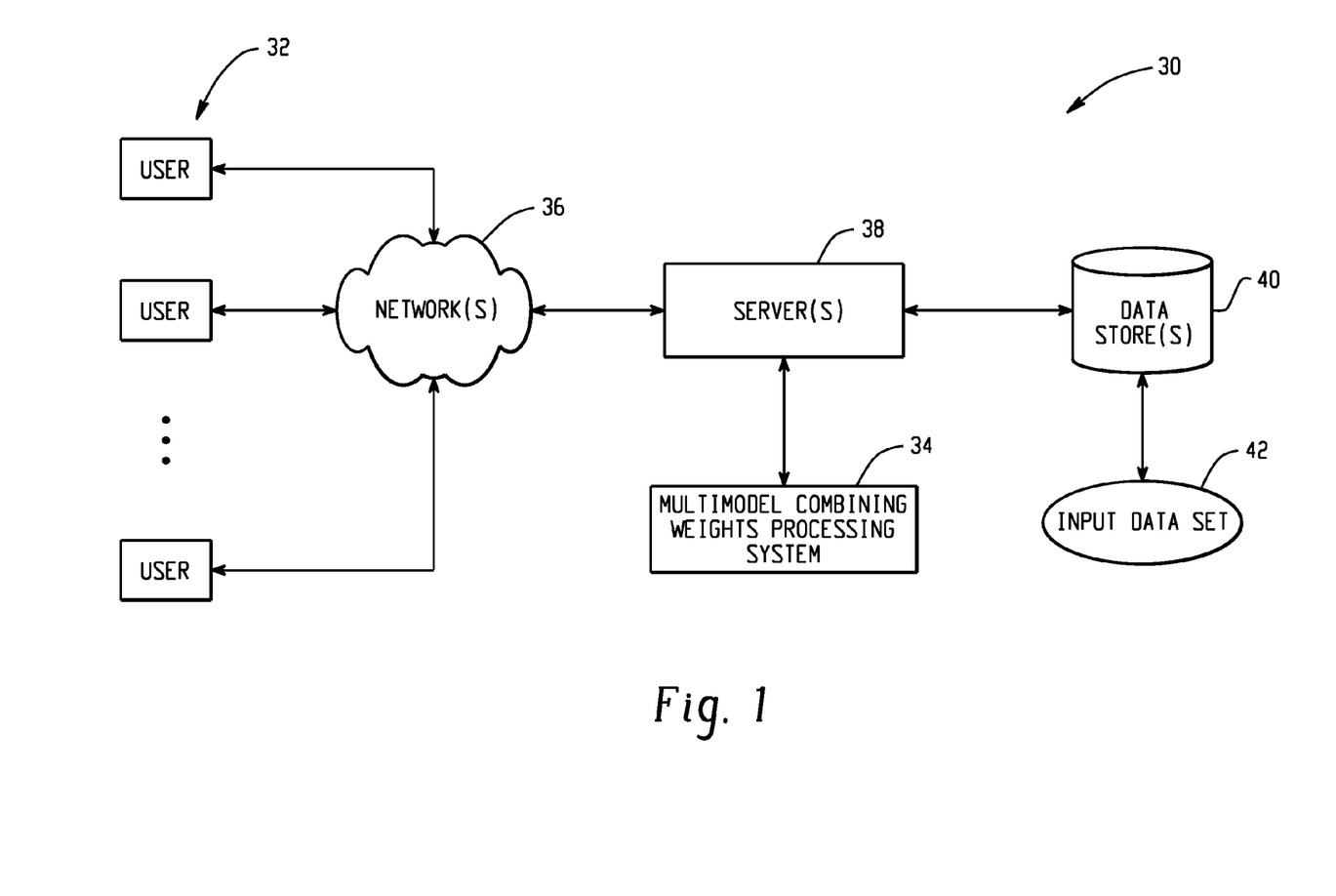
FIG. 1 is a block diagram depicting a computer-implemented environment wherein users can interact with an attribute-based hierarchy processing system.

FIG. 1 is a block diagram depicting a computer-implemented environment wherein users 32 can interact with a multimodel combining weights processing system 34 hosted on one or more servers 38 through a network 36. The system 34 contains software operations or routines for generating weighting factors for each model in a set of multiple models using an information criteria value indicating the quality of fit and complexity of the models.

The generated weighting factors are used in conjunction with forecasts or predictions from the multiple models in order to generate a composite model that may have higher predictive capabilities than individual models on their own. For example, in predicting future sales for a product, a set of predictive models is chosen. The models are fitted according to historical data. The fitted models are examined for quality, and based on this quality assessment, a combining weight is assigned to the model. Forecasts are made by each of the models in the set of predictive models, and the forecasts are multiplied by the combining weights and summed to generate a weighted average multimodel forecast.

The multimodel combining weights processing system 34 can be an integrated web-based analysis tool that provides users flexibility and functionality for performing model forecasting or prediction or can be a wholly automated system. One or more data stores 40 can store the data to be analyzed by the system 34 as well as any intermediate or final data generated by the system 34. For example, data store(s) 40 can store the plurality of models whose outputs are to be averaged and time series data used to calibrate the models and make predictions. Examples of data store(s) 40 can include relational database management systems (RDBMS), a multi-dimensional database (MDDB), such as an Online Analytical Processing (OLAP) database, etc.

The users 32 can interact with the system 34 in a number of ways, such as over one or more networks 36. One or more servers 38 accessible through the network(s) 36 can host the multimodel combining weights processing system 34. It should be understood that the multimodel combining weights processing system 34 could also be provided on a stand-alone computer for access by a user or in other computing configurations.

Figure 2:
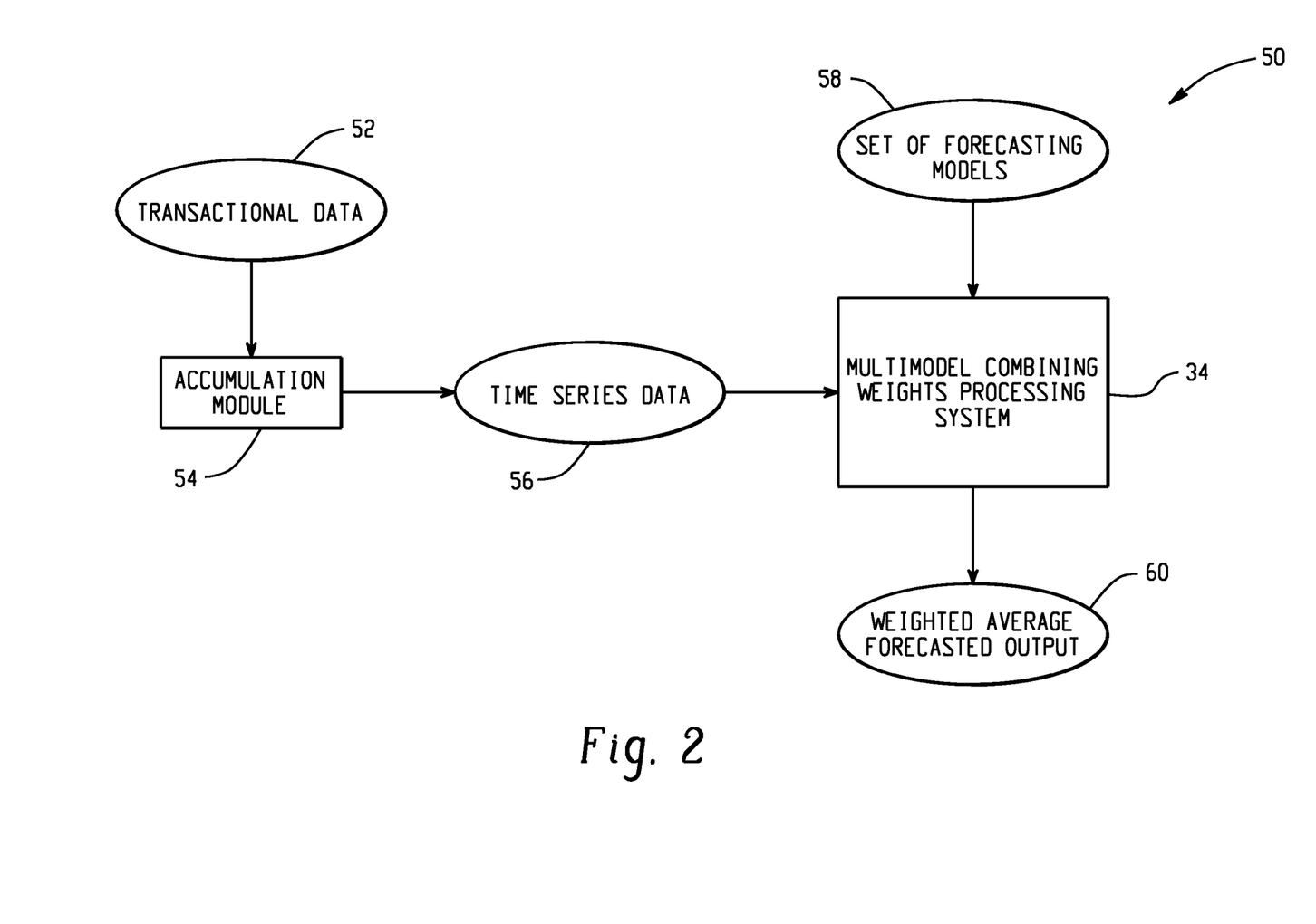
FIG. 2 is a block diagram further detailing the inputs and outputs of the multimodel combining weights processing system.

FIG. 2 is a block diagram further detailing at 50 the inputs and outputs of the multimodel combining weights processing system 34. Transactional data 52 is accumulated and may be stored over a period of time in an accumulation module 54. The transactional data 52 may be related to any number of indicators including product sales, inventory levels, resources utilized, traffic volume, weather, stock trading price, stock volume, currency rates, as well as many others. The transactional data 52 collected in the accumulation module 54 is associated with time units to generate time series data 56 which is input into the multimodel combining weights processing system 34. The multimodel combining weights processing system 34 also receives a set of forecasting models 58 whose outputs are to be combined to generate a weighted average forecasted output 60.

Figure 3:
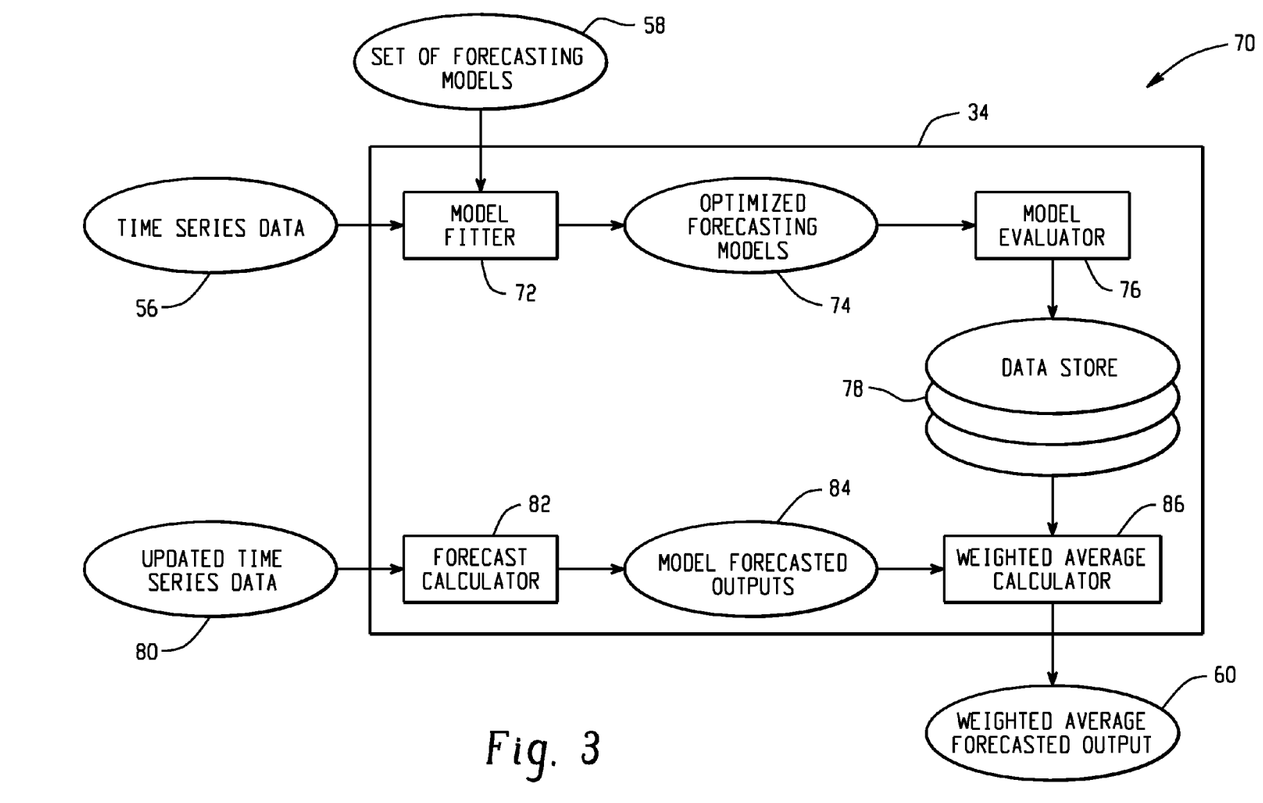
FIG. 3 depicts a block diagram further describing the function of the multimodel combining weights processing system.

FIG. 3 depicts at 70 a block diagram describing an example function of the multimodel combining weights processing system 34. The multimodel combining weights processing system 34 receives a set of forecasting models 58 and time series data 56 inputs. A model fitter 72 optimizes at least one parameter of each of the received forecasting models 58 utilizing the received time series data 56. This optimization may be done, for example, utilizing a least-squares regression or by another statistical technique. The model fitter 72 outputs a plurality of optimized forecasting models 74.

A model evaluator 76 receives the optimized forecasting models 74 and generates a weighting factor for each of the plurality of optimized models 74. The generation of the weighting factors utilizes an information criteria value that indicates fit quality and complexity of each of the optimized forecasting models. The generation of weighting factors will be discussed in detail herein. The generated weighting factors are then stored in a data store 78. The data store may be a temporary storage medium such as random access memory, or the data store may be a longer term storage medium such as a hard drive, CD, DVD, as well as many others.

In the example of FIG. 3, the multimodel combining weights processing system 34 also receives updated time series data 80 as an input. The updated time series data is received by a forecast calculator 82 that generates a model forecasted output 84 for each of the optimized forecasting models 74 in light of the received updated time series data 80. The generated model forecasted outputs 84 are weighted according to the stored weighting factors from the data store 78 in the weighted average calculator 86 and summed to produce a weighted average forecasted output 60.

Figure 4:
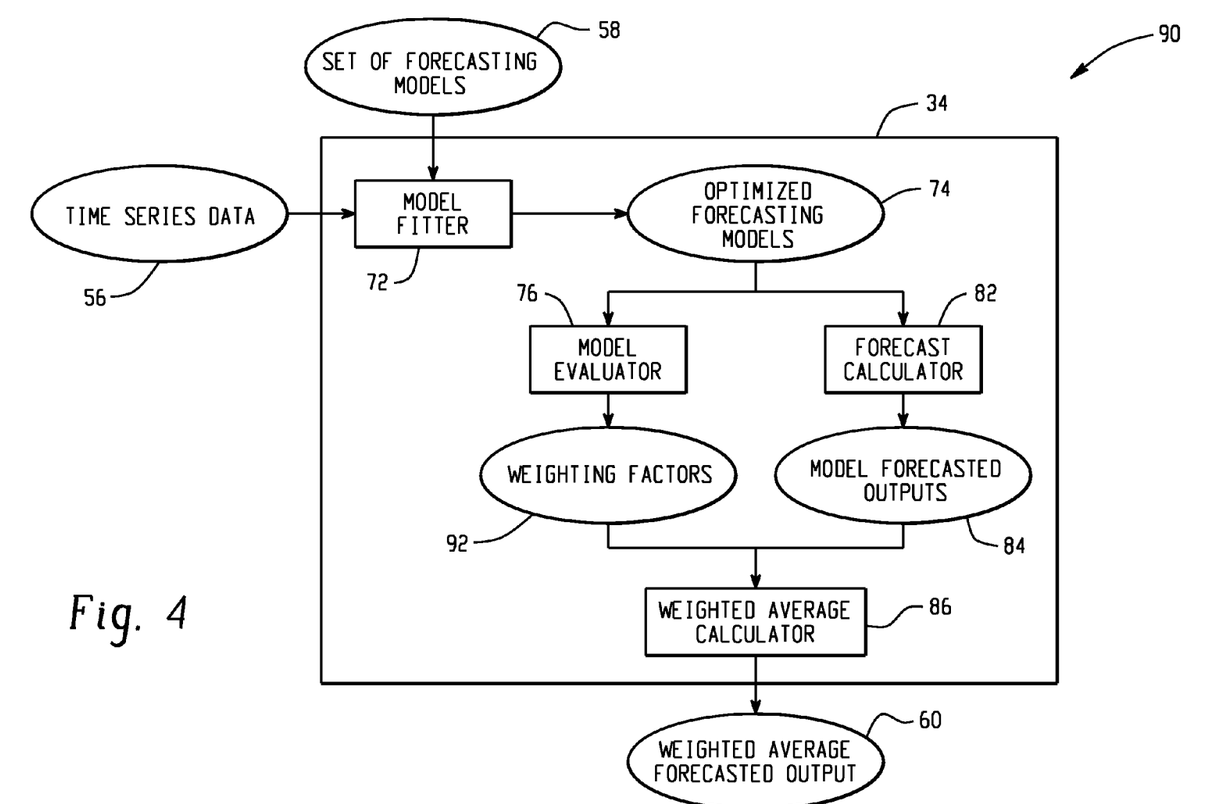
FIG. 4 depicts a block diagram describing the function of the multimodel combining weights processing system.

FIG. 4 depicts at 90 a block diagram describing another example function of the multimodel combining weights processing system 34. In the example of FIG. 4, the multimodel combining weights processing system 34 receives a set of forecasting models 58 and time series data 56 that are passed to the model fitter 72. The model fitter 72 is configured to receive the plurality of forecasting models 58 and the time series data 56 and optimizes at least one parameter of each of the forecasting models based on the time series data. This optimization may be through a least squares regression or other statistical technique. The model fitter 72 outputs a set of optimized forecasting models 74.

The optimized forecasting models 74 are received by both the model evaluator 76 and the forecast calculator 82. The model evaluator 76 is configured to generate a weighting factor 92 utilizing an information criteria for each of the optimized forecasting models 74 that indicates the fit quality and complexity of each of the optimized forecasting models 74. The forecast calculator 82 is configured to receive the plurality of optimized forecasting models and to generate a model forecasted output 84 for each of the optimized forecasting models 74. The weighted average calculator 86 weights the model forecasted outputs 84 according to the generated weighting factors 82 and sums the result to generate the weighted average forecasted output 60.

The process of generating a forecast as shown at 82 in FIGS. 3 and 4 is herein further described. A set of items, D, is selected for which future demand is to be forecast where $D_i$ is the demand for item i. For example, $D_i$ might be monthly demand for product item number 1234 in sales outlet number 567. For each item, a numerical measure, y, is to be forecast based on zero or more predictors, x, which may be different for each item. For example, one may wish to predict the number of sales in cases for an item using price per unit and measures of sales promotion activities as predictors.

For each item, $D_i$, a set of predictive models is chosen to forecast a numerical measure. Each model, $m_j$, contains a vector of variable parameters, $\theta_j$, which should be calibrated to the data available for a given item before the model will produce forecasts for that item. Thus, in more complete notation, $m_j = m_j(Y_s, X_s, \theta^*_j)$ where $\theta^*$ is the estimate of $\theta$ produced by fitting the model to past data for y and x ($Y_s$ and $X_s$ respectively). Model parameters may be calibrated to past data using a variety of methods such as the maximum likelihood method, the least squares method, as well as others.

For each item, an array of weights is generated, assigning one weight $w_j$ to each model in the set of predictive models. The combined forecast for an item is then defined by the formula:

$$y^*_t = \Sigma w_j \cdot y^*_{j,t},$$

which is the weighted average of the forecasts from the fitted models for this item.

Combined forecasts using the constant weights $w_j = 1/k$ (i.e., a simple average of the k model forecasts) may be superior to the forecast of the best individual model. Even better forecasts may be produced by using non-constant weights optimized for each item.

The Akaike Information Criterion ("AIC") is an indicator of model fit quality and complexity. The AIC is defined as:

$$AIC = -2 \cdot \ln(L) + 2 \cdot P,$$

where L is the likelihood of the model (taken from a maximum likelihood estimation of the parameters) and P is the number of fitted parameters in the model (that is, the number of elements in the parameter vector $\theta^*$). The AIC may also be computed as:

$$AIC = n \cdot \ln(mse) + 2 \cdot P,$$

where mse is the mean squared error and n is the number of data points to which the model is calibrated.

The AIC statistic trades off model fit, measured by the log likelihood or log mean squared error, and a penalty for model complexity, measured by the number of free parameters. It has theoretical justification as an approximation to the expected Kullback-Leibler discrepancy (K-L information) between the model and the unknown process that generated the data. This property of AIC is an asymptotic results, and in small sample sizes AIC is a biased estimate of the expected K-L information. An adjustment to AIC which corrects for this finite sample bias is called $AIC_c$, which is defined as:

$$AIC_c = AIC + (2 \cdot P \cdot (P+1))/(n-P-1).$$

The best known of the alternative information criteria is the Bayesian Information Criterion of BIC, which is defined as:

$$BIC = 2 \cdot \ln(L) + \ln(n) \cdot P.$$

Note that BIC is like AIC but uses the log of the sample size instead of 2 as the penalty weight for the number of parameters. It should be noted that other information criteria may be used as well as variations of the criteria described above.

For each item, all models are fit to the available data by maximum likelihood or least squares or another method. For each fitted model, the information criteria value is calculated. The calculated information criteria may then be utilized to calculate raw weights by calculating a difference value, $\Delta_j$, for each calculated information criteria value representing the difference between that information criteria value and the smallest single information criteria value calculated for the set of fitted models. Raw weights may be calculated as $$\omega_j = \exp(-\Delta_j/2),$$

and the calculated raw weights may then be normalized according to $$w_j = \omega_j/(\Sigma \omega_j).$$

If the AIC or $AIC_c$ is used as the information criterion, then the combining weight of a model reflects the relative weight of evidence for the model as a good approximation to the true data generating process of that model. Thus, this method may be expected to produce superior forecasts because the benefits of model combination are gained while giving greater weight to better models and little weight to poor models.

If information criteria other than AIC and its variants are used in this method, then the theoretical justification based on the Kullback-Leibler discrepancy is lacking but may still expect superior forecasting performance because of the similarity of these criteria to the AIC.

A simple generalization is to compute raw weights as $$\omega_j = \exp(-\lambda \cdot \Delta_j/2),$$

where the constant $\lambda$ is an adjustment that may be specified by the user, and $\Delta_j$ is equal to the difference between the information criteria value for a model and the smallest information criteria of all of the models in the set of selected predicted models.

When $\lambda=1$ the usual Akaike weights are produced. When $\lambda=0$ the weights are all equal and $w_j=1/k$, so the calculations reduce to the equally weighted simple-average-of-forecasts method. When $0<\lambda<1$, the resulting method is a compromise between the information criterion weights and equal weights.

When $\lambda$ is set to large values much greater than one (e.g., $\lambda>10$), the weight for the model with the smallest information criterion ($m^0$, for which $\Delta_j=0$) tends to $w^0=1$ and weights for all models with $\Delta_j>0$ tend to $w_j=0$. Thus, for large $\lambda$ the resulting method is the minimum IC best single model selection approach. When $\lambda>1$ but $\lambda$ is moderate in size (e.g., $\lambda=1.5$), a compromise between the information criterion weighted combined forecast and the best single model forecast is the result.

Thus, a continuum of forecast combination methods are supplied, indexed by $\lambda$, ranging between the two extremes of single best model selection and equally weighted average combination, with the default $\lambda=1$ case intermediate between these extremes and providing the theoretically optimum combination based on Kullback-Leibler information.

Figure 5:
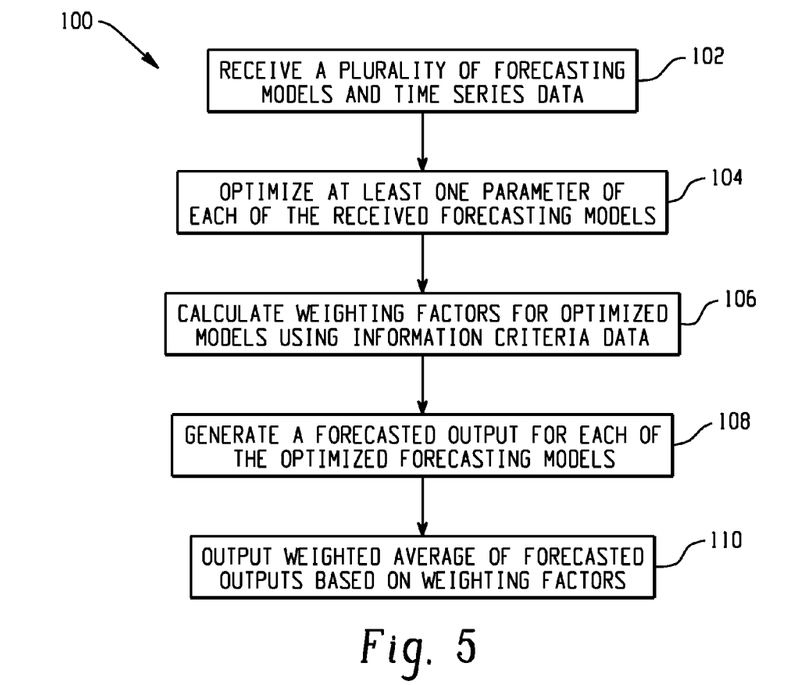
FIG. 5 is a flow diagram illustrating a process for generating a multimodel forecast output.

FIG. 5 depicts at 100 a flow diagram illustrating a process for generating a multimodel forecast output. At step 102, a plurality of forecasting models and time series data are received. At least one parameter of each of the received forecasting models is optimized in light of the time series data in step 104. Weighting factors for the optimized models are generated in step 106 using an information criteria value. A forecasted output is generated for each of the optimized forecasting models in step 108, and a weighted average of the generated forecast outputs is calculated using the weighting factors in step 110.

Figure 6:
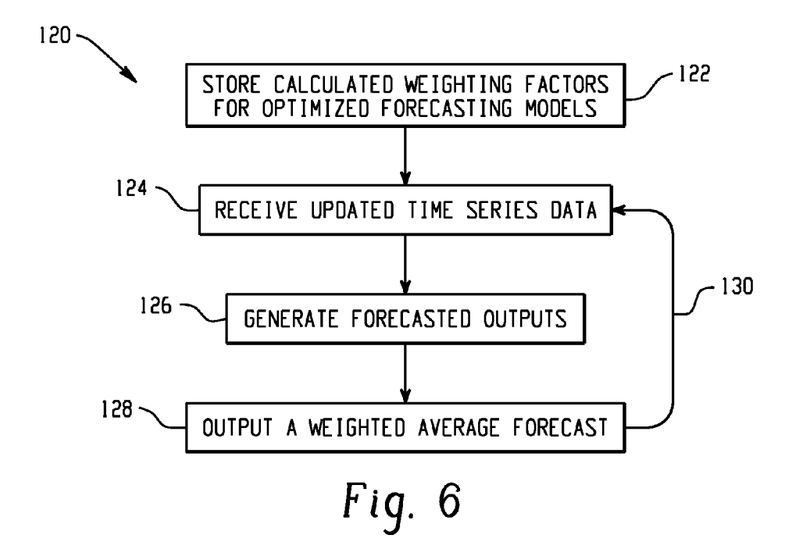
FIG. 6 is a flow diagram illustrating a process for reusing the generated weighting factors to produce weighted average forecasts in light of updated time series data.

FIG. 6 is a flow diagram illustrating a process for reusing generated weighting factors to produce weighted average forecasts in light of updated time series data at 120. At step 122 the weighting factors described with reference to FIG. 5 are stored. Updated time series data is received in step 124, and forecast outputs for each of the models are generated in step 126 in light of the updated time series data. A weighted average forecast is then output in step 128 by weighting each of the forecast outputs according to the saved weighting factors. This process may be repeated any number of times as indicated at 130 as new data is input into the multimodel processing system 34.

Figure 7A:
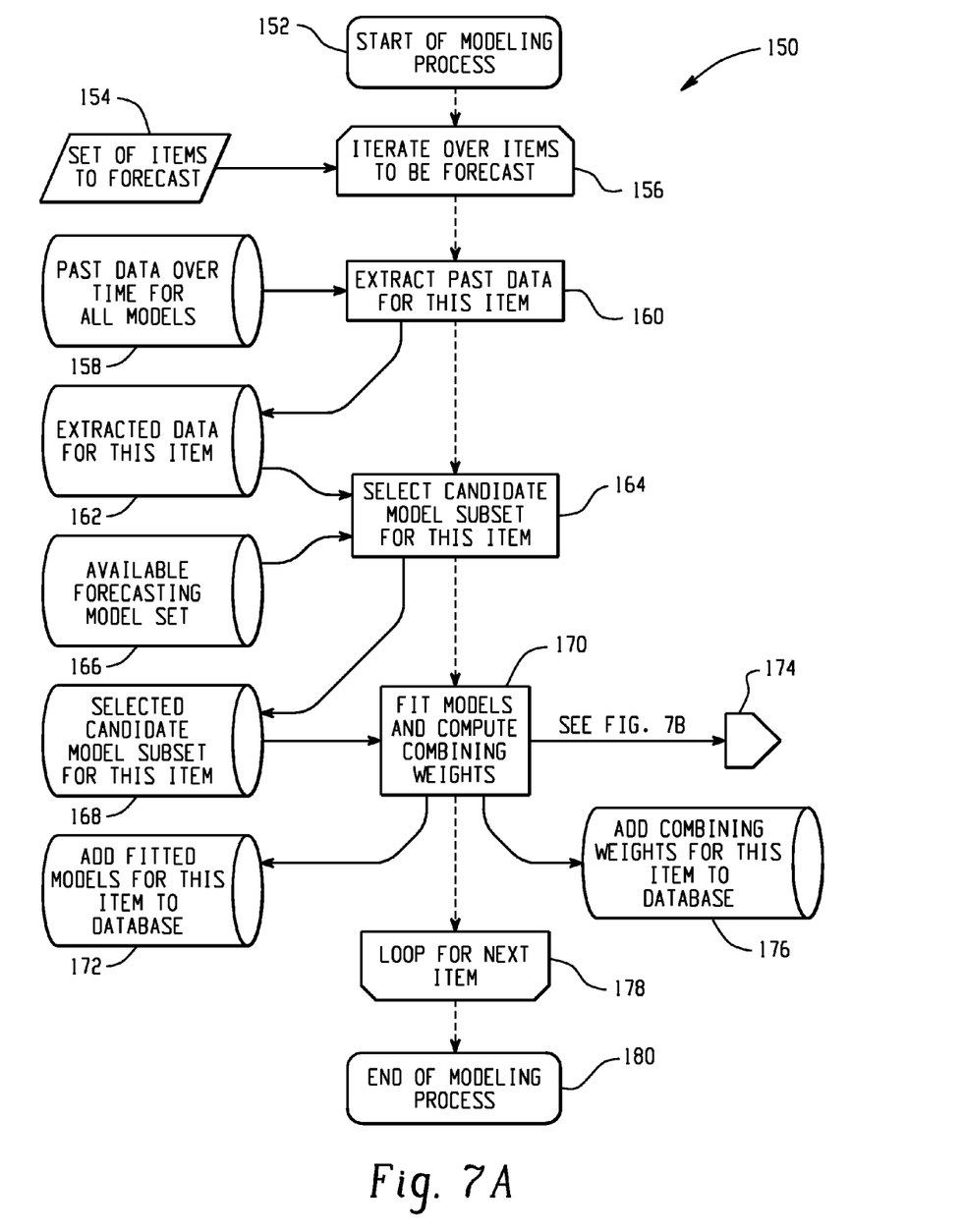
FIGS. 7a-7d are a flow diagram of a multimodel forecast creation process.

FIGS. 7a-7d are a flow diagram of an example multimodel forecast creation process. FIG. 7a depicts the start of the example process at 152. A set of items 154, such as individual stock keeping units, are identified for processing. The set of steps from 156 to 178 are then taken for each of the identified set of items 154. In step 160, past data for an item is extracted from a data store 158 containing past data for all items. This extracted past data for an item is set aside in a temporary data store as indicated at 162. At step 164 a set of candidate models is selected from a data store 166 containing available models. The set of candidate models is also set aside in a temporary data store 168. At step 170 the selected candidate models are fit, and combining weights are generated. The fitted models are stored in a data store in step 172, and the combining weights are stored in a data store in step 176. The process of generating fitted models and generating combining weights is repeated for each item as identified at step 178. Once the loop of steps 156-178 is iterated for all items, the process ends at step 180.

Figure 7B:
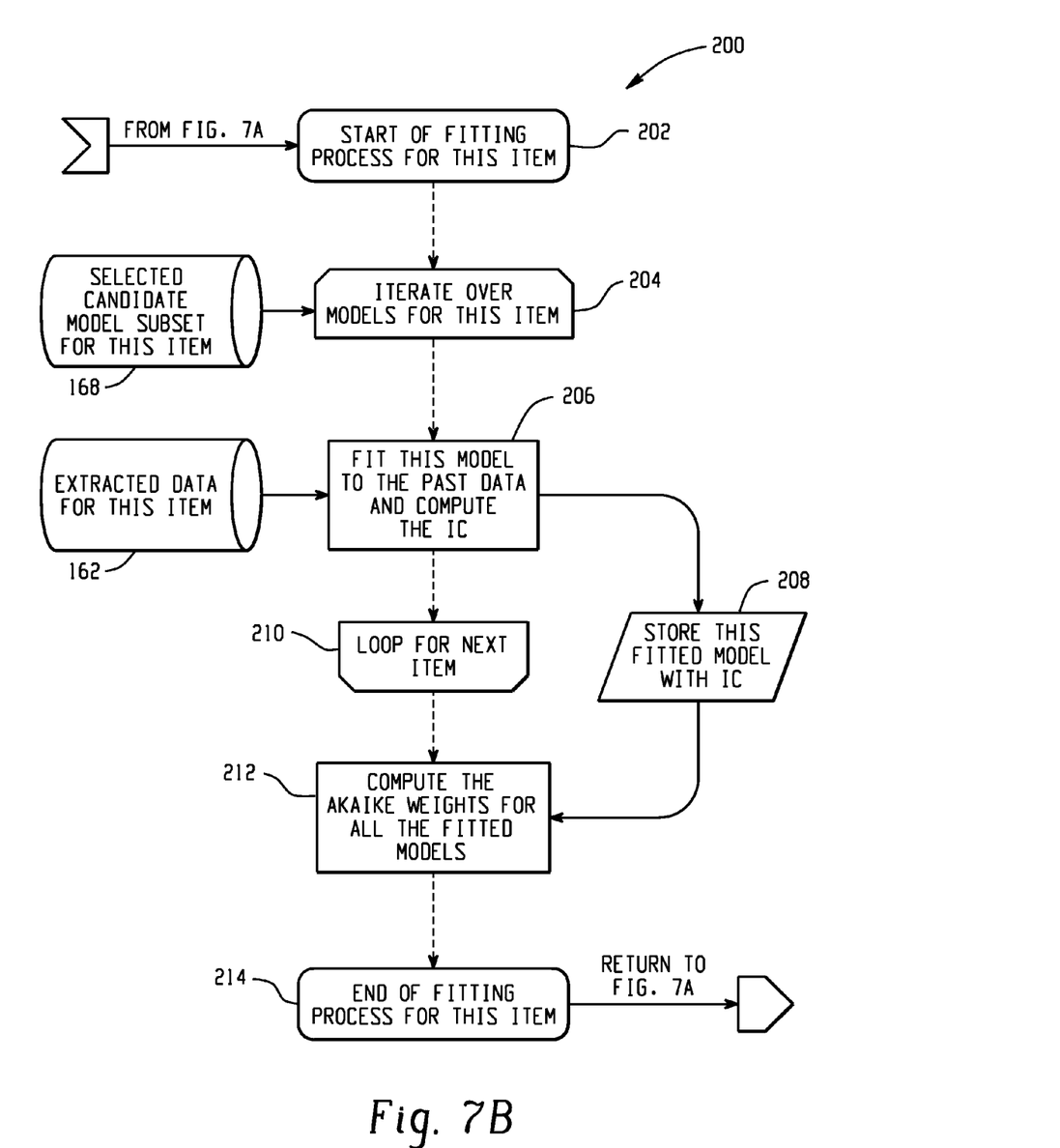

FIG. 7b illustrates step 170 in additional detail where the selected models are fitted and combining weights are computed at 200. The model fitting and combining weight generation begins at step 202. As indicated at step 204, for each model within the selected candidate model subset 168 for an item, the loop of steps 204-210 is executed. In step 206, a model is fitted according to extracted data 162 for the item. Additionally, the information criteria calculation is performed for each model. The fitted model along with the information criteria are stored as shown at 208. The fitting and information criteria calculation loop of 204-210 is repeated for each of the candidate subset models stored at 168. Once the loop 204-210 is completed for each of the models, the combining weights are computed at step 212 using the information criteria values calculated in step 206. The fitting and combining weight generating step 170 is then completed, and the fitted models are stored at step 172 and combining weights are stored at step 176.

Figure 7C:
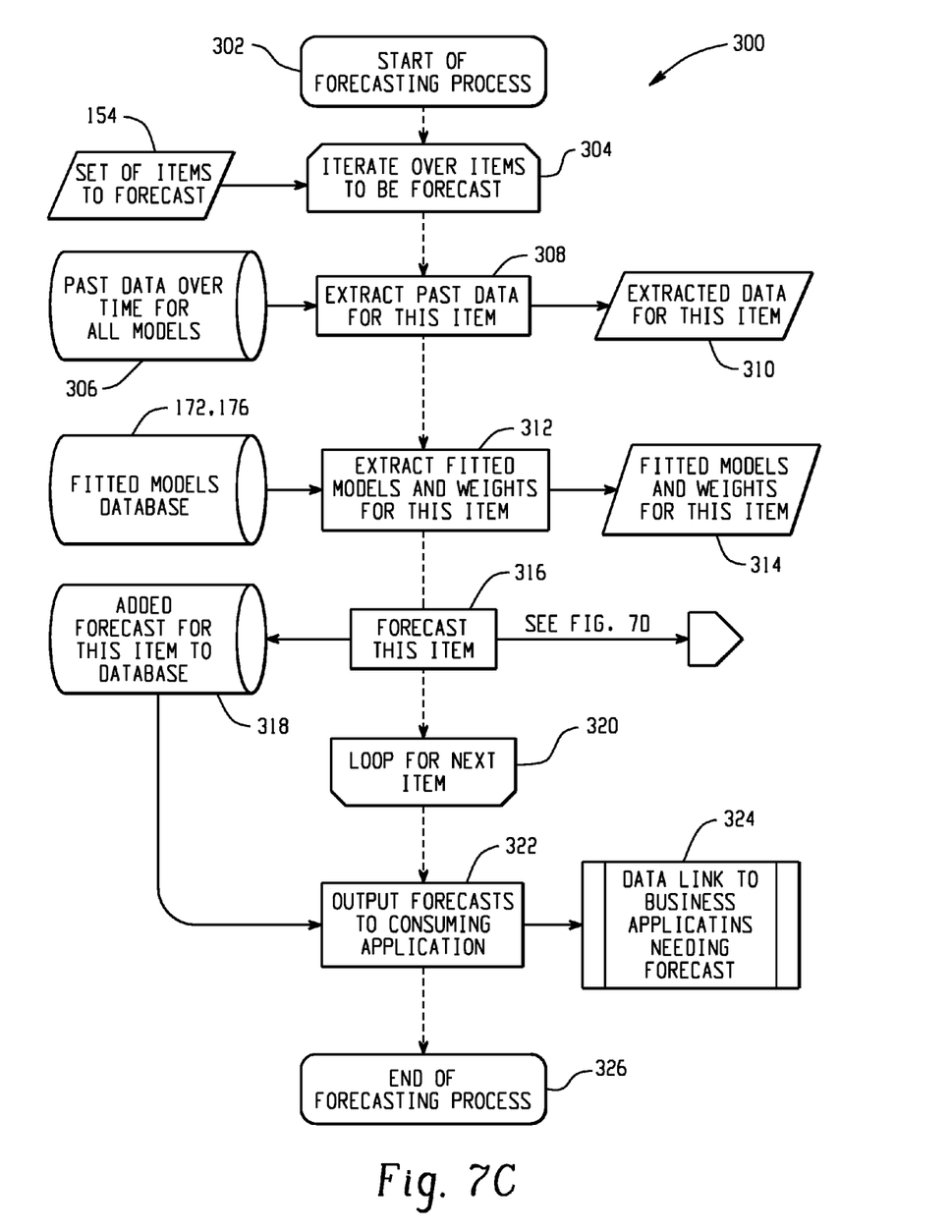

FIG. 7c illustrates at 300 a process for generating output forecasts based on the stored fitted models 176 and combining weights 176. The process for generating output forecasts begins at step 302. A set of items 154, such as individual stock keeping units, are identified for processing. The set of steps from 304 to 320 are then taken for each of the identified set of items 154. In step 308, past data for the item is extracted from a data store 306. The past data 306 in FIG. 7c may be different data than the past data 158 in FIG. 7a used to fit the models, as the past data 306 of FIG. 7c may be new or updated data to reflect transactions or other occurrences since the model fitting steps of FIG. 7a. The extract data 310 is stored in a temporary data store. In step 312, the stored fitted models 172 and combining weights 176 are accessed and placed into temporary storage 314. In step 316, a forecast is generated for each of the fitted models 172 in light of the extracted data 310 and the resulting forecasts are weighted and summed. Calculated forecasts are stored as shown at 318, and the loop 304-

320 is repeated for remaining items to be forecast. The stored forecasts 318 may then be output as shown at 322 such as by forwarding the forecasts to business applications needing forecasts as shown at 324.

Figure 7D:
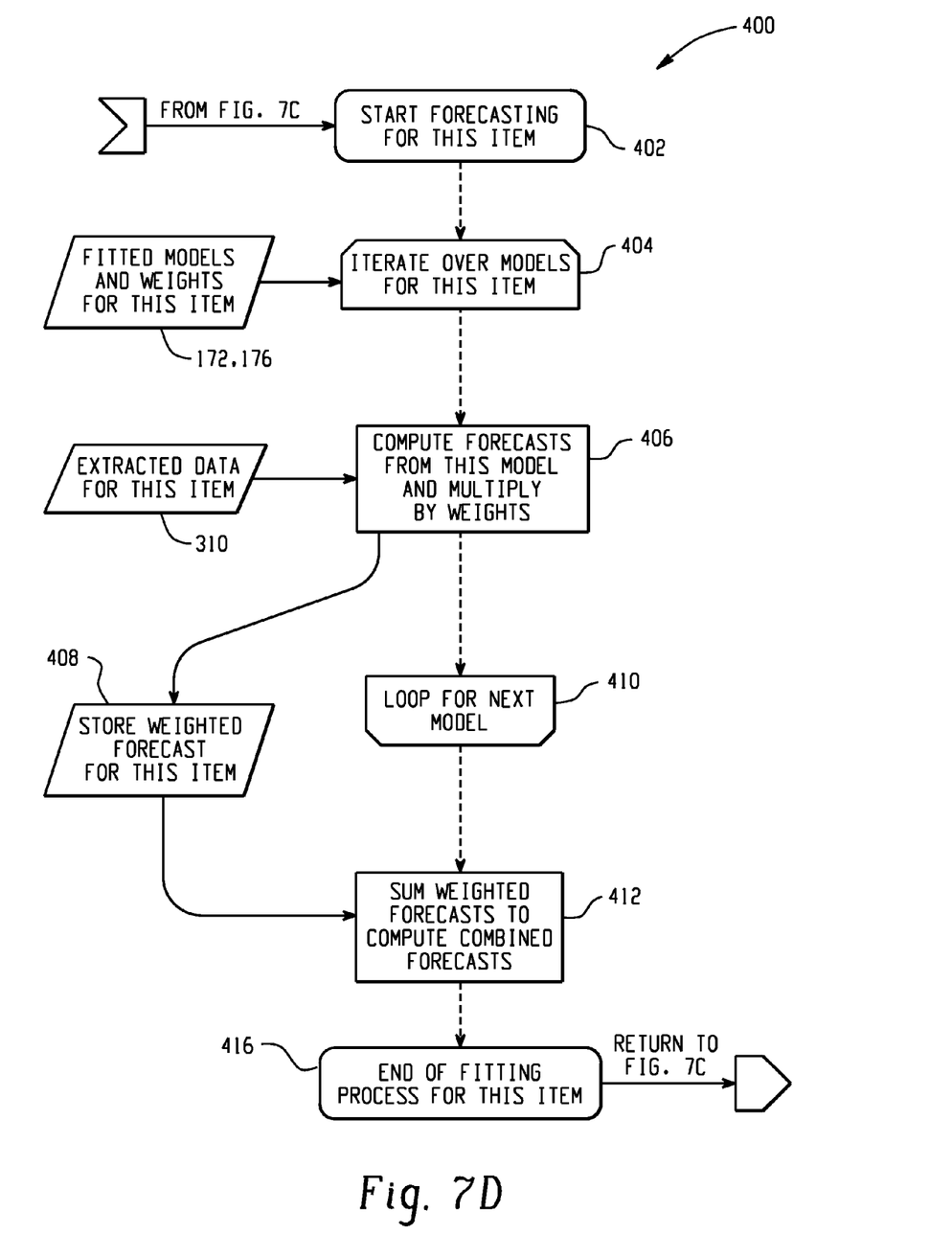

FIG. 7d illustrates at 400 a process for generating a weighted average forecast for an item. The process begins at step 402 and proceeds to step 404 which begins a loop to be executed for each of the stored fitted models 172. In step 406, a forecast is computed for the fitted model being processed in the loop iteration in light of the data 310 extracted for the item. The computed forecast is multiplied by the combining weight 176 associated with the fitted model 172 and stored as shown at 408. The loop 404-410 is then repeated for each of the fitted models 172. After weighted forecasts 408 have been generated for each of the fitted models, the weighted forecasts 408 are summed to computed a combined multimodel forecast in step 412. The process then returns to FIG. 7c for the storage step 318, and repetition of the loop 304-316 for remaining items to be forecast.

Figure 8:
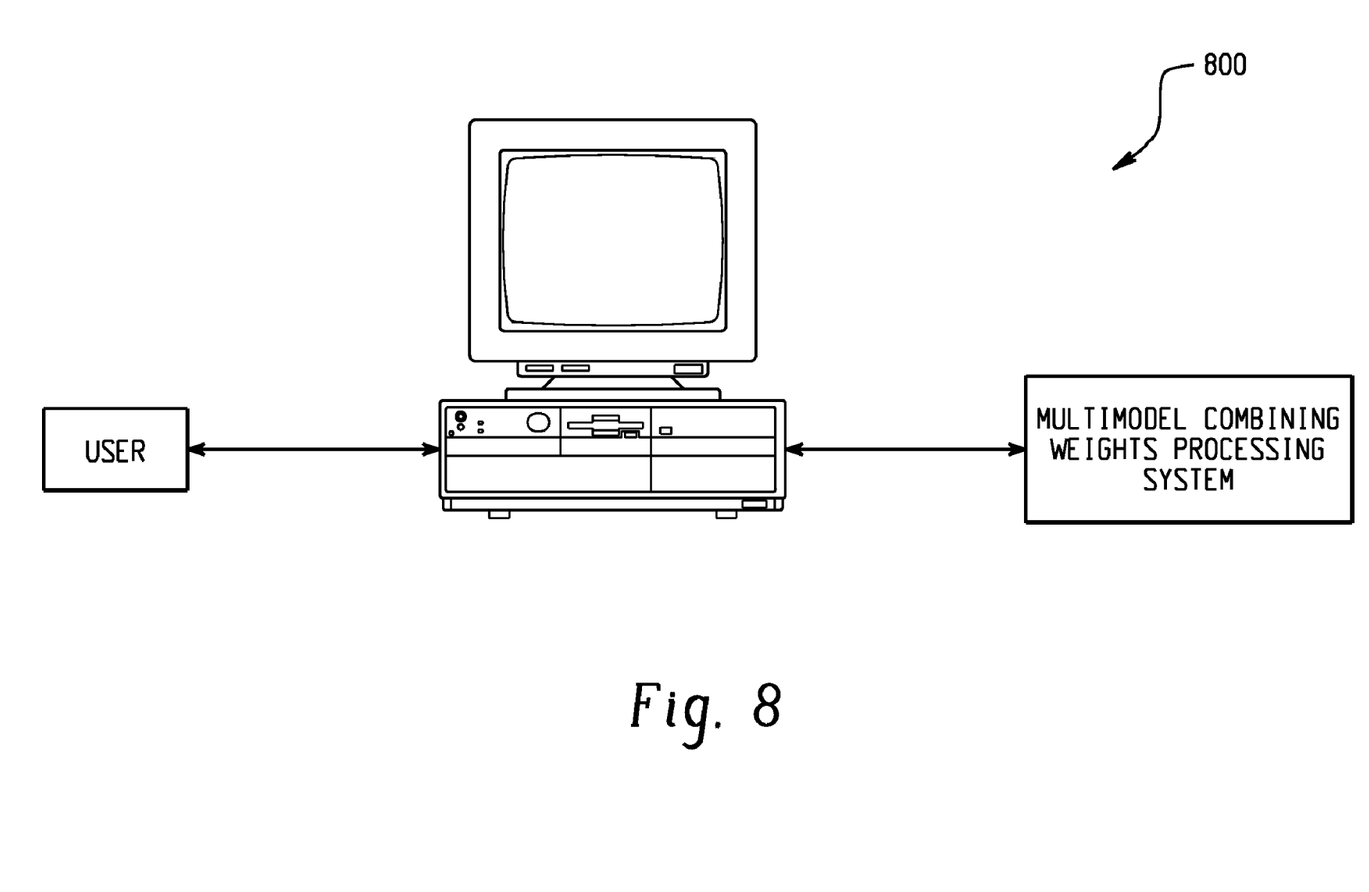
FIG. 8 is a block diagram depicting an environment wherein a user can interact with a attribute-based hierarchy processing system.

While examples have been used to disclose the invention, including the best mode, and also to enable any person skilled in the art to make and use the invention, the patentable scope of the invention is defined by claims, and may include other examples that occur to those skilled in the art. Accordingly, the examples disclosed herein are to be considered non-limiting. As an illustration, the systems and methods may be implemented on various types of computer architectures, such as for example on a single general purpose computer or workstation (as shown at 800 on FIG. 8), or on a networked system, or in a client-server configuration, or in an application service provider configuration. Additionally, a system may include all of the features described in this specification or any combination thereof.

It is further noted that the systems and methods may include data signals conveyed via networks (e.g., local area network, wide area network, internet, etc.), fiber optic medium, carrier waves, wireless networks, etc. for communication with one or more data processing devices. The data signals can carry any or all of the data disclosed herein that is provided to or from a device.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform methods described herein. Other implementations may also be used, however, such as firmware or even appropriately designed hardware configured to carry out the methods and systems described herein.

The systems' and methods' data (e.g., associations, mappings, etc.) may be stored and implemented in one or more different types of computer-implemented ways, such as different types of storage devices and programming constructs (e.g., data stores, RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The invention claimed is:

1. A computer-implemented method for generating a weighted average forecast model, comprising:
   receiving, using one or more processors, a plurality of forecasting models;
   receiving, using the one or more processors, time series data;
   optimizing, using the one or more processors, one or more parameters for each of the received forecasting models, wherein optimizing a parameter includes using the received time series data;
   determining, using the one or more processors, an information criteria value for each of the optimized forecasting models, wherein the information criteria value indicates fit quality and complexity;
   determining, using the one or more processors, a lowest calculated information criteria value;
   determining, using the one or more processors, an information criteria delta value for each of the optimized forecasting models, wherein a delta value indicates a difference between an information criteria value for an optimized forecasting model and the lowest calculated information criteria value;
   determining, using the one or more processors, raw weights for each of the optimized forecasting models using the information criteria delta values;
   determining, using the one or more processors, normalized weighting factors for each of the optimized forecasting models using the raw weights;
   generating, using the one or more processors, a weighted average forecast model using the optimized forecasting models and the normalized weighting factors; and
   generating a forecast using the weighted average forecast model.

2. The method of claim 1, further comprising:
   generating a forecasted output for each of the optimized forecasting models; and
   generating a weighted average of the forecasted outputs using the normalized weighting factors.

3. The method of claim 2, further comprising:
   receiving updated time series data;
   generating an updated forecasted output for each of the optimized forecasting models utilizing the updated time series data; and
   generating an updated weighted average of the updated forecasted outputs using the normalized weighting factors.

4. The method of claim 2, wherein the weighted average indicates forecasted monthly sales of a product.

5. The method of claim 2, further comprising:
   generating additional weighted averages for a plurality of stock keeping units.

6. The method of claim 1, wherein the time series data includes data associated with operation of a physical system over a period of time.

7. The method of claim 6, wherein the physical system is a manufacturing system, a grocery store chain, or a retail store chain.

8. The method of claim 1, further comprising optimizing the one or more parameters according to a least squares regression.

9. The method of claim 1, further comprising using an Akaike Information Criterion for the information criteria value.

10. The method of claim 9, further comprising calculating the Akaike Information Criterion (AIC) according to:

$$AIC=-2\ln(L)+2\cdot P,$$

wherein L is a likelihood value corresponding to the optimized forecasting model; and
wherein P is a number of fitted parameters in the optimized forecasting model.

11. The method of claim 9, further comprising calculating the Akaike Information Criterion (AIC) according to:

$$AIC=n\cdot\ln(mse)+2\cdot P,$$

wherein mse is a mean squared error;
wherein n is a number of data points for which the optimized forecasting model is calibrated; and
wherein P is a number of fitted parameters in the optimized forecasting model.

12. The method of claim 1, wherein the information criteria value is an adjusted Akaike Information Criterion (AICc), the method further comprising calculating the adjusted Akaike Information Criterion (AICc) according to:

$$AICc=AIC+(2\cdot P\cdot(P+1))/(n-P-1),$$

wherein AIC is an Akaike Information Criterion for the optimized forecasting model;
wherein n is a number of data points for which the optimized forecasting model is calibrated; and
wherein P is a number of fitted parameters in the optimized forecasting model.

13. The method of claim 1, wherein the information criteria value is a Bayesian Information Criterion (BIC), the method further comprising calculating the Bayesian Information Criterion (BIC) according to:

$$BIC=-2\cdot\ln(L)+\ln(n)\cdot P,$$

wherein L is a likelihood value corresponding to the optimized forecasting model;
wherein n is a number of data points for which the optimized forecasting model is calibrated; and
wherein P is a number of fitted parameters in the optimized forecasting model.

14. The method of claim 1, further comprising computing the raw weights (wraw) according to:

$$wraw=\exp(-\Delta/2),$$

wherein $\Delta$ is the information criteria delta value.

15. The method of claim 1, further comprising computing the raw weights (wraw) according to:

$$wraw=\exp(\lambda\cdot-\Delta/2),$$

wherein $\Delta$ is the information criteria delta value; and
wherein $\lambda$ is an adjustment factor.

16. The method of claim 15, wherein the adjustment factor is predetermined.

17. The method of claim 1, further comprising storing the weighted average forecast model, and wherein the normalized weighting factors are stored in a random access memory.

18. The method of claim 2, wherein the weighted average is a forecasted future value for monetary sales of a product, a quantity of sales of a product, a monetary value of market demand of a product, a physical quantity of market demand for a product, inventory needs at a retail outlet, a quantity of order by an identified customer, a quantity of a resource needed for a production process, a volume of traffic, transportation logistics, quantity of service requests, a stock price, a stock trading volume, a commodity trading volume, a commodity usage, a product consumption, a population change, an average income, an average wealth, a likelihood of default on a loan, a currency exchange rate, a tax rate, a volume of open market activity of U.S. Federal Reserve system, an average temperature, or an average rainfall.

19. The method of claim 2, wherein the weighted average is a forecasted future value for calendar years, fiscal years, quarters of years, months, weeks, days, hours, minutes, or seconds.

20. A system for generating a weighted average forecast model, comprising:
one or more processors;
one or more non-transitory computer-readable storage mediums containing instructions configured to cause the one or more processors to perform operations including:
receiving a plurality of forecasting models;
receiving time series data;
optimizing one or more parameters for each of the received forecasting models, wherein
optimizing a parameter includes using the received time series data;
determining an information criteria value for each of the optimized forecasting models, wherein the information criteria value indicates fit quality and complexity;
determining a lowest calculated information criteria value;
determining an information criteria delta value for each of the optimized forecasting models, wherein a delta value indicates a difference between an information criteria value for an optimized forecasting model and the lowest calculated information criteria value;
determining raw weights for each of the optimized forecasting models using the information criteria delta values;
determining normalized weighting factors for each of the optimized forecasting models using the raw weights;
generating a weighted average forecast model using the optimized forecasting models and the normalized weighting factors; and
generating a forecast using the weighted average forecast model.

21. A non-transitory computer program product for generating a weighted average forecast model, tangibly embodied in a machine-readable non-transitory storage medium, including instructions configured to cause a data processing system to:
receive a plurality of forecasting models;
receive time series data;
optimize one or more parameters for each of the received forecasting models, wherein optimizing a parameter includes using the received time series data;
determine an information criteria value for each of the optimized forecasting models, wherein the information criteria value indicates fit quality and complexity;
determine a lowest calculated information criteria value;

determine an information criteria delta value for each of the optimized forecasting models, wherein a delta value indicates a difference between an information criteria value for an optimized forecasting model and the lowest calculated information criteria value;

determine raw weights for each of the optimized forecasting models using the information criteria delta values;

determine normalized weighting factors for each of the optimized forecasting models using the raw weights;

generate a weighted average forecast model using the optimized forecasting models and the normalized weighting factors; and generating a forecast using the weighted average forecast model.

22. The system of claim 20, further comprising instructions configured to cause the one or more processors to perform operations including:

generating a forecasted output for each of the optimized forecasting models; and generating a weighted average of the forecasted outputs using the normalized weighting factors.

23. The system of claim 22, further comprising instructions configured to cause the one or more processors to perform operations including:

receiving updated time series data;

generating an updated forecasted output for each of the optimized forecasting models utilizing the updated time series data; and generating an updated weighted average of the updated forecasted outputs using the normalized weighting factors.

24. The system of claim 20, further comprising instructions configured to cause the one or more processors to perform operations including:

using an Akaike Information Criterion for the information criteria value.

25. The system of claim 24, further comprising instructions configured to cause the one or more processors to perform operations including:

calculating the Akaike Information Criterion (AIC) according to:

$$AIC = -2\ln(L) + 2 \cdot P,$$

wherein L is a likelihood value corresponding to the optimized forecasting model; and wherein P is a number of fitted parameters in the optimized forecasting model.

26. The system of claim 24, further comprising instructions configured to cause the one or more processors to perform operations including:

calculating the Akaike Information Criterion (AIC) according to:

$$AIC = n \cdot \ln(mse) + 2 \cdot P,$$

wherein mse is a mean squared error;

wherein n is a number of data points for which the optimized forecasting model is calibrated; and wherein P is a number of fitted parameters in the optimized forecasting model.

27. The system of claim 20, wherein the information criteria value is an adjusted Akaike Information Criterion (AICc), the method further comprising instructions configured to cause the one or more processors to perform operations including:

calculating the adjusted Akaike Information Criterion (AICc) according to:

$$AICc = AIC + (2 \cdot P \cdot (P+1))/(n - P - 1),$$

wherein AIC is an Akaike Information Criterion for the optimized forecasting model;

wherein n is a number of data points for which the optimized forecasting model is calibrated; and wherein P is a number of fitted parameters in the optimized forecasting model.

28. The system of claim 20, wherein the information criteria value is a Bayesian Information Criterion (BIC), the method further comprising instructions configured to cause the one or more processors to perform operations including:

calculating the Bayesian Information Criterion (BIC) according to:

$$BIC = -2 \cdot \ln(L) + \ln(n) \cdot P,$$

wherein L is a likelihood value corresponding to the optimized forecasting model;

wherein n is a number of data points for which the optimized forecasting model is calibrated; and wherein P is a number of fitted parameters in the optimized forecasting model.

29. The system of claim 20, further comprising instructions configured to cause the one or more processors to perform operations including:

computing the raw weights (wraw) according to:

$$wraw = \exp(-\Delta/2),$$

wherein $\Delta$ is the information criteria delta value.

30. The system of claim 20, further comprising instructions configured to cause the one or more processors to perform operations including:

computing the raw weights (wraw) according to:

$$wraw = \exp(\lambda \cdot -\Delta/2),$$

wherein $\Delta$ is the information criteria delta value; and wherein $\lambda$ is an adjustment factor.

31. The computer program product of claim 21, further comprising instructions configured to cause the data processing system to:

generate a forecasted output for each of the optimized forecasting models; and generate a weighted average of the forecasted outputs using the normalized weighting factors.

32. The computer program product of claim 31, further comprising instructions configured to cause the data processing system to:

receive updated time series data;

generate an updated forecasted output for each of the optimized forecasting models utilizing the updated time series data; and generate an updated weighted average of the updated forecasted outputs using the normalized weighting factors.

33. The computer program product of claim 21, further comprising instructions configured to cause the data processing system to:

use an Akaike Information Criterion for the information criteria value.

34. The computer program product of claim 33, further comprising instructions configured to cause the data processing system to:

calculate the Akaike Information Criterion (AIC) according to:

$$AIC = -2\ln(L) + 2 \cdot P,$$

wherein L is a likelihood value corresponding to the optimized forecasting model; and wherein P is a number of fitted parameters in the optimized forecasting model.

35. The computer program product of claim 33, further comprising instructions configured to cause the data processing system to:
 calculate the Akaike Information Criterion (AIC) according to:

$$AIC = n \cdot \ln(mse) + 2 \cdot P,$$

wherein mse is a mean squared error;
wherein n is a number of data points for which the optimized forecasting model is calibrated; and
wherein P is a number of fitted parameters in the optimized forecasting model.

36. The computer program product of claim 21, wherein the information criteria value is an adjusted Akaike Information Criterion (AICc), the method further comprising instructions configured to cause the data processing system to:
 calculate the adjusted Akaike Information Criterion (AICc) according to:

$$AICc = AIC + (2 \cdot P \cdot (P+1))/(n-P-1),$$

wherein AIC is an Akaike Information Criterion for the optimized forecasting model;
wherein n is a number of data points for which the optimized forecasting model is calibrated; and
wherein P is a number of fitted parameters in the optimized forecasting model.

37. The computer program product of claim 21, wherein the information criteria value is a Bayesian Information Criterion (BIC), the method further comprising instructions configured to cause the data processing system to:
 calculate the Bayesian Information Criterion (BIC) according to:

$$BIC = -2 \cdot \ln(L) + \ln(n) \cdot P,$$

wherein L is a likelihood value corresponding to the optimized forecasting model;
wherein n is a number of data points for which the optimized forecasting model is calibrated; and
wherein P is a number of fitted parameters in the optimized forecasting model.

38. The computer program product of claim 21, further comprising instructions configured to cause the data processing system to:
 compute the raw weights (wraw) according to:

$$wraw = \exp(-\Delta/2),$$

wherein $\Delta$ is the information criteria delta value.

39. The computer program product of claim 21, further comprising instructions configured to cause the data processing system to:
 compute the raw weights (wraw) according to:

$$wraw = \exp(\lambda \cdot -\Delta/2),$$

wherein $\Delta$ is the information criteria delta value; and
wherein $\lambda$ is an adjustment factor.

* * * * *